US006785829B1

(12) United States Patent
George et al.

(10) Patent No.: US 6,785,829 B1
(45) Date of Patent: Aug. 31, 2004

(54) MULTIPLE OPERATING FREQUENCIES IN A PROCESSOR

(75) Inventors: Varghese George, Folsom, CA (US); Robert L. Farrell, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 09/608,160

(22) Filed: Jun. 30, 2000

(51) Int. Cl.[7] .............................. G06F 1/32; G06F 1/26; G06F 1/04
(52) U.S. Cl. ...................... 713/320; 713/300; 713/322; 713/324; 713/600
(58) Field of Search ................................ 713/300, 340, 713/501, 320, 322, 324, 600

(56) References Cited

U.S. PATENT DOCUMENTS

| 5,398,262 | A | * | 3/1995 | Ahuja .......................... 375/356 |
| 5,560,024 | A | * | 9/1996 | Harper et al. ................. 713/322 |
| 5,586,308 | A | * | 12/1996 | Hawkins et al. ............. 713/501 |
| 5,925,133 | A | * | 7/1999 | Buxton et al. .............. 713/323 |
| 5,974,556 | A |   | 10/1999 | Jackson et al. |
| 6,141,762 | A | * | 10/2000 | Nicol et al. .................. 713/300 |
| 6,298,448 | B1 | * | 10/2001 | Shaffer et al. ............... 713/322 |

FOREIGN PATENT DOCUMENTS

EP          0901063 A   *   3/1999

OTHER PUBLICATIONS

Mark Horowitz, "Clocking Strategies in High Performance Processors", 1992 Symposium on VLSI Circuits Digest of Technical Papers, pp. 50–53.*
Dennis T. Cox et al., "IBM AS/400 Processor Technology", 1991, pp. 448–452.*
P. Nilsson et al., CMOS On–Chip Clock for Digital Signal Processors:, Electronics Letters, Apr. 15, 1993, vol. 29, No. 8, pp. 669–670.*
Arif Merchant et al., "Analysis of a Control Mechanism for a Variable Speed Processor", IEEE Transactions on computer, vol. 45, No. 7, Jul. 1996, pp. 793–801.*

* cited by examiner

Primary Examiner—Thomas Lee
Assistant Examiner—Chun Cao
(74) Attorney, Agent, or Firm—Blakely, Sokoloff, Taylor & Zafman LLP

(57) ABSTRACT

A power control circuit an corresponding technique for adjusting operating frequency and/or supply voltage in sections of a single electronic device while maintaining substantially constant operating frequency and/or supply voltage in the other sections in the electronic device. Such control is based on the operating environment of the hardware product employing the electronic device by determining whether the hardware product is connected to an external power source. As a result, the electronic device in the hardware product is able to operate at full frequency and voltage during certain situations and to operate at a reduced frequency and/or voltage in some sections of the processor and not in the other sections during other situations.

21 Claims, 7 Drawing Sheets

MULTIPLE OPERATING FREQUENCIES IN A PROCESSOR

FIELD OF THE INVENTION

The present invention relates to the field of power management. More particularly, the present invention relates to an electronic device that may operate with multiple voltages and frequencies.

BACKGROUND OF THE INVENTION

Over the last few years, there have been many advances in semiconductor technology. These advances have lead to the development of high-speed electronic devices that operate at higher frequencies and support additional and/or enhanced features. As a result, high-speed electronic devices normally require more power and dissipate more heat as a by-product than electronic devices operating at lower frequencies.

In order to satisfy customer requirements, battery-powered portable computers (e.g., laptop or notebook style computers, hand-held computers, etc.) are implemented with high-speed processors similar to those implemented in desktop computers. The high-speed processors use more power and dissipate more heat within the computer system. This heat may cause damage and malfunctions within the computer system.

Normally, the heat produced by internal logic of conventional portable computers is dissipated through passive cooling. For portable computers, passive cooling involves spreading the heat uniformly along an interior of its casing. Thereafter, the casing of the portable computer may be cooled through conduction, convection and radiation.

One prior method of reducing heat involves reducing the operating frequency and/or supply voltage utilized by an electronic device within the computer system. However, such a method requires changing voltage and frequency to the entire electronic device and may require the implementation of complex external frequency control circuits that are used to indicate various bus ratios, resulting in additional complexities and manufacturing cost.

Another problem with the prior methods is that they may require resetting the electronic device during the transition sequence. If the electronic device is reset, the user context is lost. In addition, the device has to go through an initialization sequence all over again, thereby rebooting in a long transition sequence time.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Although certain details are set forth in order to provide a thorough understanding of the present invention, it may be apparent to a person of ordinary skill in the art that the present invention may be practiced through many different embodiments, other than those embodiments illustrated, without deviating from the spirit and scope of the present invention. In other instances, well-known circuits, elements or methods have not been described in detail in order to avoid unnecessarily obscuring the present invention.

The detailed description describes embodiments of an electronic device and methods enabling a functional unit within an electronic device to operate in multiple power states, while maintaining a substantially constant power state for another functional unit of the electronic device. In one embodiment, selection of the power states is dependent upon whether an external power source is coupled to the hardware product.

Herein, a number of terms and symbols are frequently used to describe logic, information or characteristics. An "electronic device" is a single integrated circuit (IC) component or a multiple IC components operating in tandem. Examples of an electronic device include, but are not limited or restricted to, a processor, micro-controller, and a chipset. "hardware product" is broadly defined as any commercial or non-commercial goods having the electronic device. Examples of a hardware product include, but is not limited or restricted to, a portable computer (e.g., a laptop or notebook computer, hand-held computer, etc.), a wireless telephone, camcorder, still-camera, video cassette recorder, set-top cable box, a video game system and the like. A "communication bus" is broadly defined as one or more information-carrying mediums (e.g., electrical wire, a board trace, a bus line, fiber optics, a wireless communication channel, an infrared "IR" link, a radio frequency "RF" link, etc.). In addition, "information" includes data, address and control signals.

Figure 1:
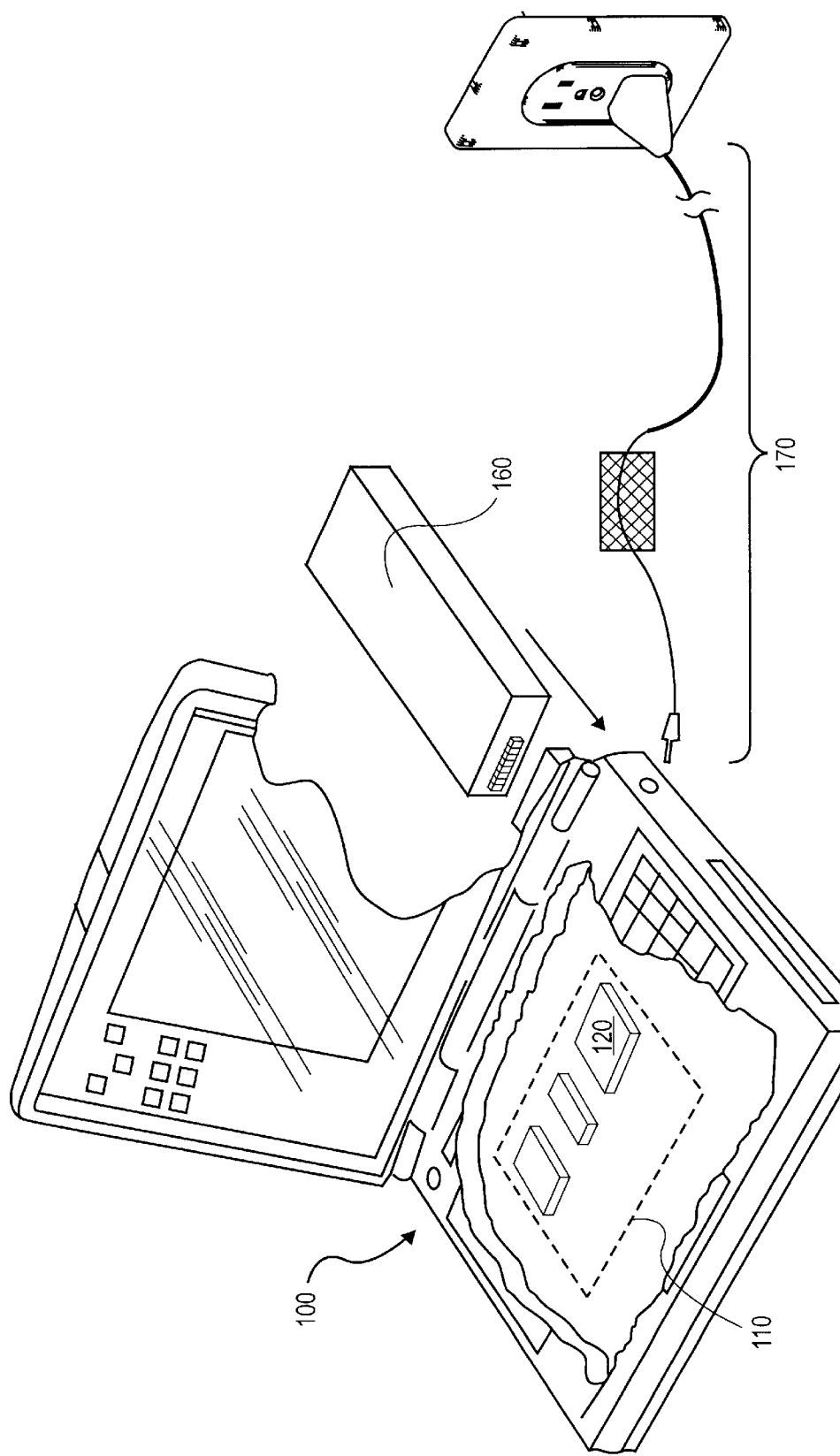
FIG. 1 illustrates one embodiment of a computer.

FIG. 1 illustrates one embodiment of a computer. In one embodiment, the hardware product may be a laptop computer 100 with a removable battery pack 160, and an external power supply kit 170. In an alternative embodiment, the power control circuit may be implemented in other types of hardware product, such as radio, television, and hand held computers.

Computer 100 includes a computer system board 110, which contains a power control circuit to alter the power state of an electronic device through voltage and frequency scaling in some sections of processor 120, while maintaining a substantially constant value of voltage and frequency in the other sections of processor 120. Computer 100 may be powered by removable battery pack 160 for use at any location with or without an external power supply kit 170.

When computer 100 is used only with removable battery pack 160, the power state may be lowered by reducing voltage and/or frequency to processor 120 to extend the life of battery pack 160 and reduce dissipation of heat. If computer 100 is used along with external power supply kit 170, then computer 100 may be used with a higher voltage and/or frequency to increase the performance of computer 100 because power conservation may not be as much of a concern.

The power usage by processor 120 may be lowered by reducing voltage and/or frequency because of the relationship among power, voltage, and frequency. As noted in equation 1 below, power has a "squared" law dependence with voltage and a generally proportional relationship with operating frequency.

Equation 1: P α V²×F, where
"P"=power consumed by the processor
"V"=voltage supplied to the processor; and
"F"=operating frequency of the processor.

According to Equation 1, power may be saved by reducing voltage and/or frequency. For example, to achieve a ten percent (10%) decrease in power at a constant frequency, approximately five percent (5%) decrease in voltage is required since (0.90)×P=(0.95 V)². To achieve a ten percent (10%) decrease in power at a constant voltage, a ten percent (10%) decrease in frequency is required since (0.90)×P= V²×(0.90)F.

However, to achieve approximately a ten percent (10%) reduction in power, by decreasing the supply voltage and operational frequency of processor 120, slightly over a three percent (3%) reduction to voltage and power is required since (0.966 V)²×(0.966F)=(0.901)×Power. Thus, power usage by processor 100 may be conserved more through reducing both voltage and frequency than by reducing one alone.

Figure 2:
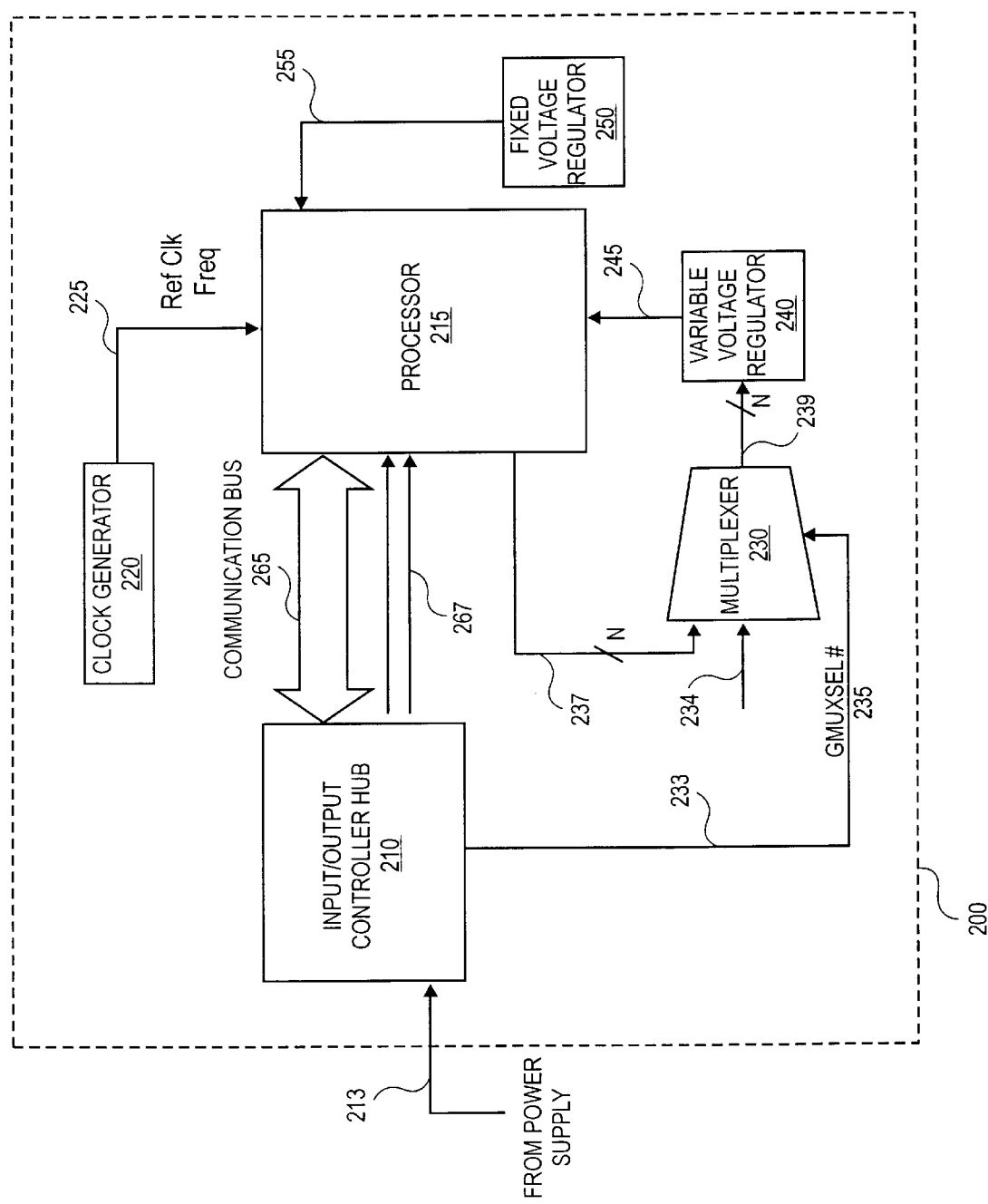
FIG. 2 illustrates one embodiment of a computer system board.

FIG. 2 illustrates one embodiment of a computer system board. In one embodiment, for example, the circuit and components of FIG. 1 may be used in reference to FIG. 2. However, in another embodiment, other circuits and components may be used. In one embodiment, for example, computer system board 200 may be computer system board 110 of FIG. 1.

In one embodiment, computer system board 200 may include an Input/Output (I/O) controller hub 210, a processor 215, a clock generator 220, a multiplexer 230, a variable voltage regulator 240, a fixed voltage regulator 250. In an alternative embodiment, these components may reside within a single integrated circuit.

In one embodiment, for example, I/O controller hub 210 is a control circuitry associated an input or output devices (not shown) that forms a hardware interface between the input/output devices (not shown) and processor 215. In one embodiment, I/O controller hub 210 is coupled to multiplexer 230 through a signal line 233. Multiplexer 230 is a integrated circuit designed to select a signal from multiple inputs on signal lines 234, 237, and output the selected signal on signal line 239. The selection of an input is controlled by control signal received from I/O controller hub 210 on signal line 235.

In one embodiment, signal line 234 provides a selected voltage identification code from an N bit bus to multiplexer 230. Signal line 237 provides a voltage identification code for the current state of supply voltage from variable voltage sections of processor 215 to multiplexer 230. Signal line 233 sends a signal to select a new voltage identification code between signal line 234 and 237. Then, variable voltage regulator 240, in turn, uses the voltage identification code from signal line 239 to generate a new supply voltage. Through a signal line 245, the new voltage is supplied to the variable voltage sections of processor 215.

In one embodiment, I/O controller hub 210 may contain a plurality of voltage identification codes. Of these codes, a first voltage identification code may provide high supply voltages to the variable voltage sections of processor 215. A second voltage identification code may provide low supply voltage to the variable voltage sections of processor 215. In another embodiment, first voltage identification code may provide a base (or minimum) voltage to the variable voltage sections of processor 215. The remaining voltage codes may represent unique supply voltages which are greater than the base voltage.

In one embodiment, variable voltage regulator 240 may contain more than one sub-variable voltage regulator such that independent variable supply voltages may be provided to different sections of processor 215. In one embodiment, signal line 245 may include more than one signal line to transfer independently generated supply voltages to different sections of processor 215.

In one embodiment, variable voltage regulator 240 may be used to generate variable supply voltage based on a voltage identification code selected by I/O controller hub 210. A selection of voltage identification code by I/O controller hub 210 depends on whether computer 100 of FIG. 1 is operating with a high power source or a low power source. In one embodiment, if computer 100 of FIG. 1 is operating with a high power source (e.g., external power supply kit 170 of FIG. 1), variable voltage regulator 240 may receive a voltage identification code which is set to generate a high voltage.

If computer 100 of FIG. 1 is operating with a low power source (e.g., battery 160 of FIG. 1), variable voltage regulator 240 may receive a voltage identification code which is set to generate a lower supply voltage. Lowering voltage output to the variable voltage sections of processor 215, in turn, reduces the power that is consumed by the variable voltage section.

Fixed voltage regulator 250 may be coupled to other sections of processor 215 that may require predetermined value of substantially fixed voltage through signal line 255. Fixed voltage regulator 250 may provide substantially fixed voltages whether or not computer 100 of FIG. 1 is operating with a high power source or a low power source. In one embodiment, fixed voltage regulator 250 may include more than one sub-fixed voltage regulators such that different values of substantially fixed supply voltages may be provided to different sections of processor 215.

I/O controller hub 210, which receives power from a power supply line 213, is coupled to processor 215 via communication bus 265 to send and receive information, and with signal lines 267 to assert and deassert signals. The operation of communication bus 265 and signal lines 267 from I/O controller hub 210 to processor 215 is explained in further detail below in relation to FIGS. 5 and 6B.

Clock generator 220 is coupled to processor 215 through a signal line 225. Clock generator 220 provides a global reference clock frequency to processor 215 for controlling the operation of processor 215 by synchronizing the time intervals during which data signals can be communicated from one, component to another. In one embodiment, clock generator 220 may generate a clock signal having a frequency of approximately 66.67 MHz. In alternative embodiments, clock generator 220 may generate clock signals having other frequencies.

Figure 3:
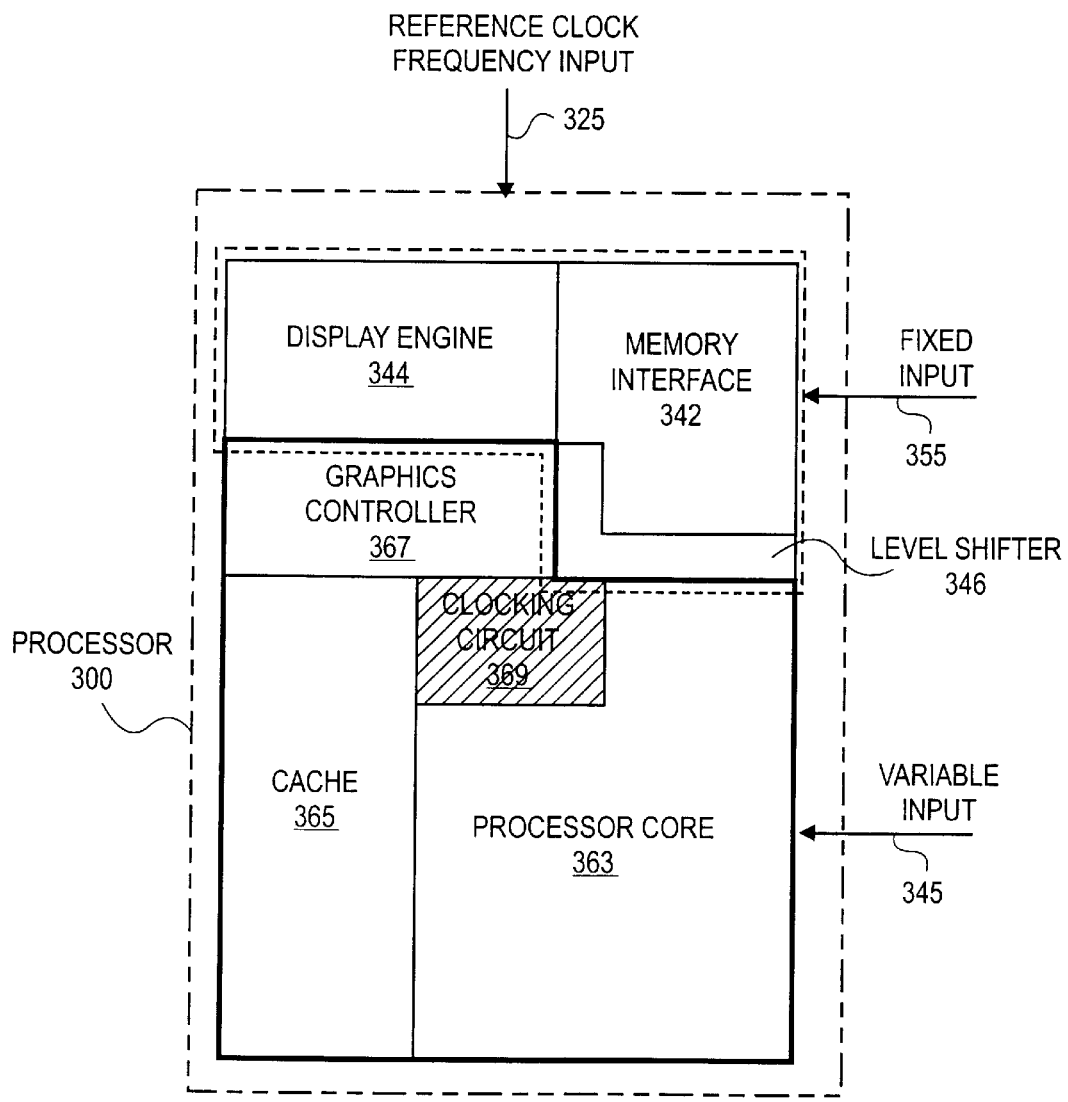
FIG. 3 illustrates one embodiment of a processor.

FIG. 3 illustrates one embodiment of a processor. In one embodiment, for example, the circuit and components of FIG. 1 and 2 may be used in reference to FIG. 3. For example, processor 300 may be processor 215 of FIG. 2. In one embodiment, processor 300 may be processor 215 of FIG. 2. Processor 300 includes a memory interface 342, a display engine 344, a voltage level shifter 346, a processor core 363, a cache, a graphics controller 367, and a clocking circuit 369. However, in another embodiment, other circuits and components may be used.

In one embodiment, memory interface 342, display engine 344, and voltage level shifter 346 receive substantially fixed voltages through a fixed input signal line 355. In one embodiment, fixed input signal line 355 may be multiple signal lines to provide different values of fixed voltages to different fixed voltage sections of processor 300. In one embodiment, for example, fixed input signal line 355 may be a signal line 255 of FIG. 2.

Because memory interface 342, display engine 344, and voltage level shifter 346 typically require to be in operation all the time, relatively low and substantially fixed voltages are supplied to these components. Memory interface 342, display engine 344, and voltage level shifter 345 receive substantially fixed voltage whether or not computer 100 of FIG. 1 is connected with a low power source (e.g., battery 160 of FIG. 1) or a high power source (e.g., external power supply kit 170 of FIG. 1).

Memory interface 342 is used to manage information flows between I/O controller hub 210 of FIG. 2 and processor 215 of FIG. 2. Display engine 344 is a display management circuit that controls video display. Voltage level shifter 346 is used to shift the voltage levels of some of the signals that operate within processor 300, which may vary in supply voltages, to enable integration of the various circuits within processor 300.

Electronic components that receive fixed voltage are not limited to aforementioned components but may include any components that are required to be in operation all the time. In one embodiment, memory interface 342, display engine 344, and level shifter 346 may be clocked with relatively low operating frequencies from clocking circuit 369 because these components may not require a high power state to function while not affecting the operability of the components. The operation of clocking circuit 369 is explained in detail in relation to FIG. 4.

In one embodiment, processor core 363, cache 365, and graphics controller 367 receive variable supply voltages through a variable input signal line 345. In one embodiment, variable input signal line 345 may be more than one signal lines such that variable input signal lines may provide different value of independently operable variable voltages. Processor core 363, cache 365, and graphics controller 367 are typically high performance that may require a high power state to operate effectively. As such, if computer 100 of FIG. 1, for example, is connected with a low power source (e.g., battery 160 of FIG. 1), the power state of other components within processor 300 may be lowered by reducing their supply voltages to lower value without substantially affecting the operability of processor core 363, cache 365, and graphics controller 367. If computer 100 of FIG. 1 is connected with a high power source (e.g., external power supply kit 170 of FIG. 1), the supply voltages to processor core 363, cache 365, and graphics controller 367 may be increased to enhance performance state because power conservation may not be as critical.

Processor core 363 is a main memory of processor 300, and it interprets and executes instruction sets. Cache 365 is a special memory subsystem that stores frequently accessed data and its memory locations for quick access by processor core 363. Graphics controller 367 is a controller designed to perform graphics computations and to generate graphical images to a display (not shown) in response to instructions from processor core 363. In one embodiment, graphics controller 367 may be a 3D graphics controller. Processor core 363, cache 365, and graphics controller 367 are well-known art, accordingly, a detailed description of their internal components is not provided herein.

Sections of processor 300 which receive variable voltage do not have to be limited to aforementioned components but may include other coprocessors. In one embodiment, processor core 363, cache 365, and graphics controller 367 also receive clock signals having independently variable operating frequencies from clocking circuit 369.

Figure 4:
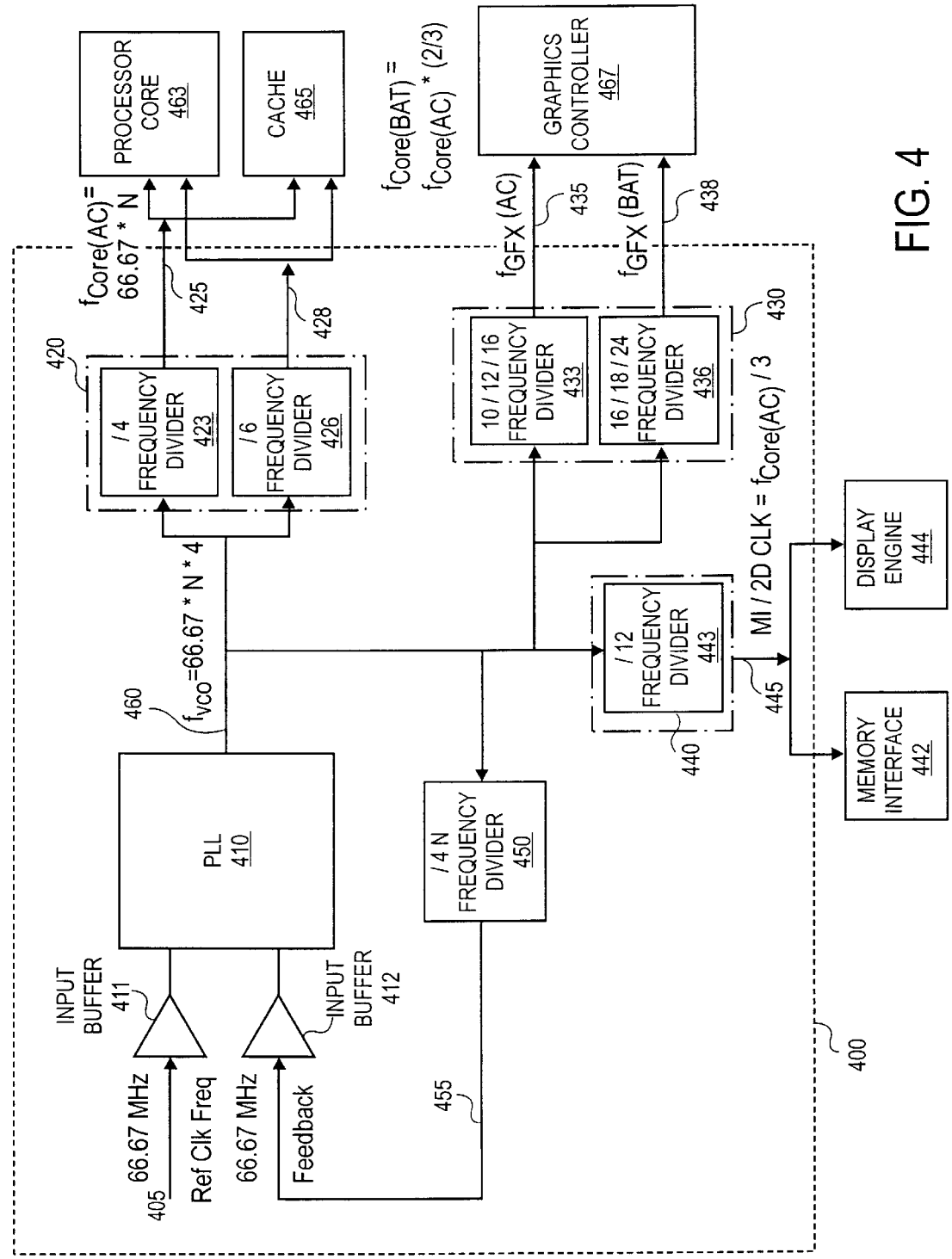
FIG. 4 illustrates one embodiment of a clocking circuit in a processor.

FIG. 4 illustrates one embodiment of a clocking circuit in a processor. In one embodiment, clocking circuit 400 includes PLL 410, input buffers 411 and 412, frequency divider blocks 420, 430, 440, and 450, and input clock frequency 405. Clock circuit 400 may be coupled to a processor core 463, a cache 465, a graphics controller 467, a memory interface face 442, and a display engine 444. Input clock signal 405 may be received from clock generator 220 of FIG. 2. In one embodiment, input clock signal 405 may be approximately 66.67 MHz. In an alternative embodiment, input clock signal 405 may have other frequencies.

PLL 410 is a control circuit that generates an output signal 460 based on an input clock signal 405. In one embodiment, PLL 410 includes a frequency representative signal that may be generated by a voltage controlled oscillator (VCO)(not shown). The frequency representative signal is compared against the input clock signal 405 to detect phase and frequency differences between the two signals. Because the frequency of input clock signal 405 may vary over time, these differences are feedback to PLL 410 via feedback signal 455 and used to lock the frequency of the PLL output signal ($f_{VCO}$) 460 to input clock signal 405. If, for example, the frequency of input clock signal 405 shifts slightly, the phase difference between the VCO signal and input clock signal 405 will begin to increase with time. This changes the control voltage on the VCO in such a way as to bring the VCO frequency back to the value of the input clock signal 405. Thus, the loop may maintain lock when the input clock signal 405 frequency varies.

PLL 410 may include a frequency multiplier that, for example, multiplies the input clock signal 405 frequency by an integer N multiple of 4. In one embodiment, for example, where input clock signal 405 has a frequency of 66.67 MHz, the PLL output signal 460 has a frequency of 266.68 MHz (4 times the input clock signal 405). As such, frequency divider 450 is used to divide the frequency of the PLL output signal 460 by the same factor as the frequency multiplier for feedback such that the two frequencies may be compared. In an alternative embodiment, PLL 410 may include a frequency multiplier that multiplies the frequency of input clock signal 405 by other factors. A PLL, a frequency divider, and a frequency multiplier are well-known in the art; accordingly, a detailed discussion of their internal operation and components is not provided.

In one embodiment, input clock signal 405 and feedback signal 455 may be coupled to input buffers 411 and 412, respectively. Input buffers 411 and 412 may be used to drive their respective signals at a particular edge rate.

Frequency divider blocks 420, 430, 440 may be used to generate multiple clock signals having different frequencies based on PLL output signal 460. These different frequency clock signals may be coupled to different components of, for example, processor 300 of FIG. 3 so that some components may operate at lower frequencies than other components and, thereby, enable processor 300 to consume less power.

Frequency divider block 420 may be used to generate multiple frequencies that may be coupled to processor core 463 and cache 465 depending on whether the components are operating with a high power source or a low power source. In one embodiment, frequency divider block 420 may include two frequency dividers 423 and 426. PLL output signal 460 is coupled to both frequency dividers 423 and 426. Frequency dividers 423 and 426 divide the frequency of the PPL output signal 460 by an integer multiple, for example, multiple 4 and 6, respectively. In one embodiment, frequency divider 423 divides the frequency of PLL output signal 460 by four in order to generate a signal having a frequency approximately equal to the frequency of input clock signal 405. In an alternative embodiment, frequency dividers 423 and 426 may divide PLL output signal 460 by other integers multiples or fractions of multiples.

The output 425 of frequency divider 423 may be selectively coupled to processor core 463 and cache 465. The output 428 of frequency divider 426 may be selectively coupled to processor core 463 and cache 465. As such, if processor core 463 and cache 465 are supplied power from a high power source (e.g., external power supply kit 170 of FIG. 1), processor core 463 and cache 465 may be coupled to the output 425 of frequency divider 423. If the operating environment changes such that processor core 463 and cache 465 are supplied power from a lower power source (e.g., battery 160 of FIG. 1), processor core 463 and cache 465 may be coupled to output 428 of frequency divider 426.

In one embodiment, frequency divider 426 may divide the frequency of PLL output signal 460 by six to decrease the frequency of the input clock signal 405 by a factor of 2/3. In another embodiment, frequency divider 426 may divide the frequency of PLL output signal 460 by other factors to reduce the frequency to less than that of output 425. The lower frequency of output 428 results in processor core 463 and cache 465 operating with a lower power state that may be supplied by a lower power source. Thus power may be conserved when operating with a lower power source.

In one embodiment, frequency divider block 430 may be used to generate multiple frequencies that may be coupled to graphics controller 467 depending on whether the component is operating with a high power source or a low power source. In one embodiment, frequency divider block 430 may include two frequency dividers 433 and 436. PLL output signal 460 is coupled to both frequency dividers 433 and 436. Frequency dividers 433 and 436 divide the frequency of the PPL output signal 460 by an integer multiple, for example, multiple 10 and 16, respectively. In one embodiment, frequency divider 433 divides the frequency of the PLL output signal 460 by 12 to decrease the frequency of the input clock signal 405 by a factor of 1/4. In an alternative embodiment, frequency dividers 433 and 436 may divide PLL output signal 460 by other integers multiples or fractions of multiples.

The output 435 of frequency divider 433 and output 438 of frequency divider 436 may be selectively coupled to graphics controller 467. As such, if graphics controller 467 is supplied power from a high power source (e.g., external power supply kit 170 of FIG. 1), graphics controller 467 may be coupled to the output 435 of frequency divider 433. If the operating environment changes such that graphics controller 467 is supplied power from a lower power source (e.g., a battery 160 of FIG. 1), graphics controller 467 may be coupled to output 438 of frequency divider 436.

In one embodiment, frequency divider 436 may divide the frequency of PLL output signal 460 by 18 to decrease the frequency of the input clock signal 405 by a factor of 2/9. In another embodiment, frequency divider 436 may divide the frequency of PLL output signal 460 by other factors to reduce the frequency to less than that of output 435. Yet, in another embodiment, frequency divider 436 may divide the frequency of PLL output signal 460 by other factors to increase the frequency to more than that of output 435.

The lower frequency of output 438 results in graphics controller 467 operating with a lower power state that may be supplied by a lower power source. Thus power may be conserved when operating with a lower power source.

Frequency divider block 440 may be used to generate multiple frequencies that may be coupled to memory interface 442 and display engine 444. Because memory interface 442 and display engine 444 require to operate all the time, memory interface 442 and display engine 444 receive substantially fixed frequencies whether or not the components are operating with a high power source or a low power source. In one embodiment, frequency divider block 440 may include a frequency divider 443. PLL output signal 460 is coupled to frequency divider 443. Frequency divider 443 divides the frequency of the PPL output signal 460 by an integer multiple, for example, multiple 12. In one embodiment, frequency divider 443 divides the frequency of PLL output signal 460 by 12 to decrease the frequency of input clock signal 405 by a factor of 1/3. In an alternative embodiment, frequency divider 443 may divide PLL output signal 460 by other integers multiples or fractions of multiples.

In an alternative embodiment, processor core 463, cache 465, and graphics controller 467 may have more than two power states and frequency blocks 420 and 430 may have additional frequency dividers corresponding to the additional power states.

Figure 5:
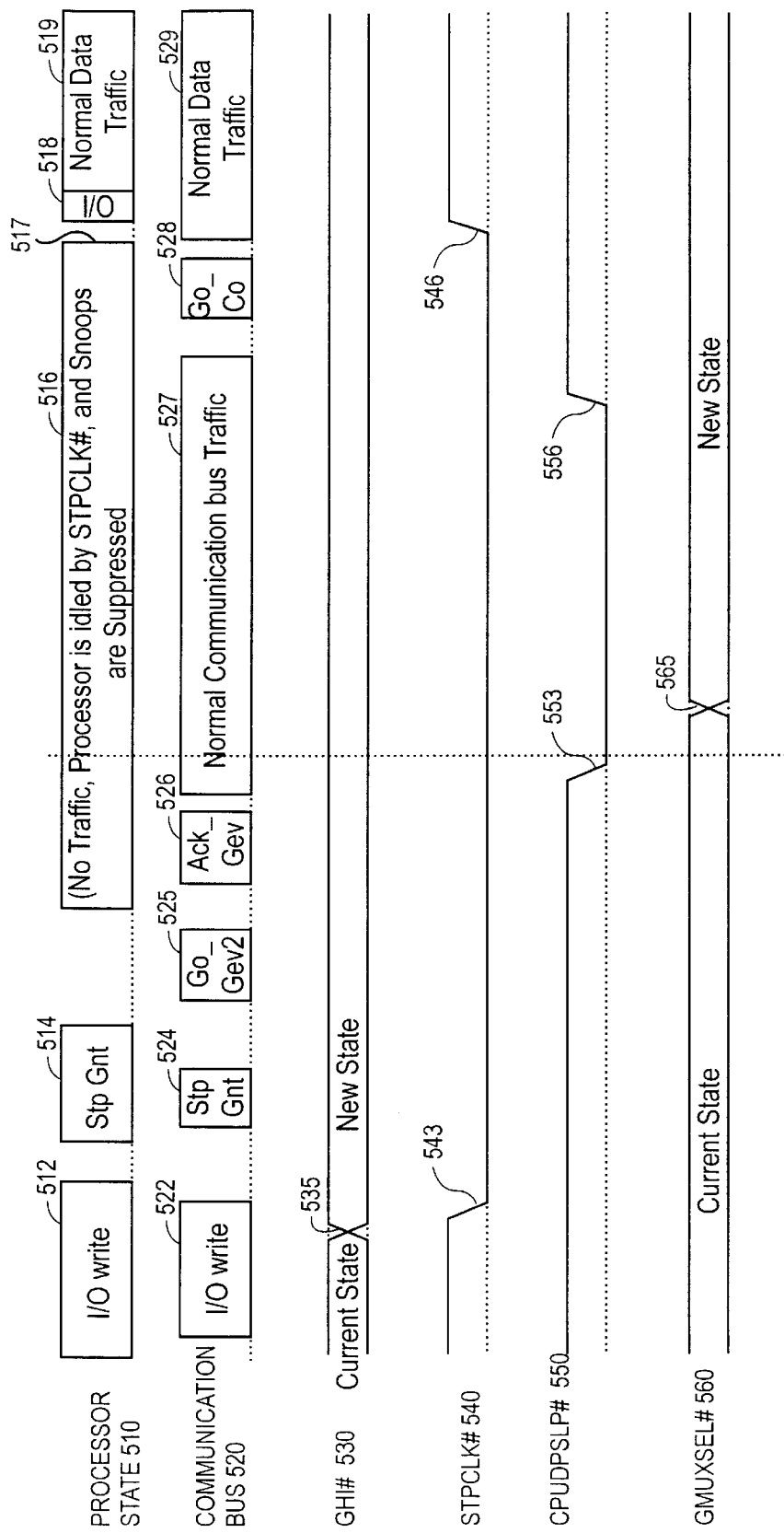
FIG. 5 is a timing diagram illustrating one embodiment of timing within a processor.

FIG. 5 is a timing diagram illustrating one embodiment of a timing within a processor. In one embodiment, for example, the circuits and components of FIG. 2 and 3 may be used in reference to FIG. 5. However, in other embodiments, other circuits and components may be used. In one embodiment, for example, processor 300 of FIG. 3 may vary in supply voltage and operating frequencies in some sections (V/F variable sections), while may remain in substantially constant supply voltage and operating frequencies in the other sections (V/F fixed sections).

In one embodiment, a processor state 510 may include the relative timing of a I/O write 512, a Stp Gnt 514, a processor state 516, and I/O write 518 massage. A communication bus state 520 may include the relative timing of an I/O write 522, a Stp Gnt 524, a Go_Gev2 525, an Ack_Gev 526, and a Go_Co 528 message. In one embodiment these messages may travel through communication bus 265 of FIG. 2. In one embodiment, the relative timing of signals STPCLK# 530, GHI# 540, CPUDPSLP# 550, and GMUXSEL# 560 may travel through signal lines 267 of FIG. 2.

In one embodiment, system board 200 may utilize global clock signals that may be generated by clock generator 220 of FIG. 2. In one embodiment, timing starts with a software driver instructing voltage and/or frequency (V/F) variable sections of processor 215 of FIG. 2 to go into a sleep mode. First, the software driver writes a desired value, I/O write 512 to a register (not shown) to select the desired performance state for V/F variable sections and launches a hardware sequence. Second, I/O controller hub 210 of FIG. 2 writes desired performance state, I/O write 522, through communication bus 265 of FIG. 2 to processor 215 of FIG. 2. Then, I/O controller hub 210 of FIG. 2 changes GHI# 530 at a point 535 to indicate the new performance state based on the value written.

Once GHI# 530 signal is sent, cache 365 and graphics controller 367 of FIG. 3 go into a Quiescent state, an idling state. In order to go into Quiescent state, first, I/O controller hub 210 of FIG. 2 asserts STPCLK# 540 at a point 543 to stop the global reference clock precisely after I/O write instruction 522 is retired. Second, processor 215 of FIG. 2 begins Stop Grant cycle, Stp Gnt# 514 and 524, to bring processor 215 of FIG. 2 to the Quick Start (QS) state. In QS state, power consumption is reduced and the majority of V/F variable sections are disabled, but PLL is kept functional. Third, I/O controller hub 210 of FIG. 2 runs and terminates the Stop Grant cycle on communication bus 265 of FIG. 2, then sends Go_Gev2 525 to memory interface 342 of FIG. 3 to stop generating snoops. Snoops are generated to monitor each functional block unit to check validity of data. Forth, memory interface 342 of FIG. 2 receives Go__Gev 2 525 and switches processor 215 of Figure to a mode in which it does not generate snoops. Fifth, memory interface 342 of FIG. 3 puts cache 365 of FIG. 3, and graphics controller 367 of FIG. 3 residing within processor 300 of FIG. 3 into a Quiescent state.

Once cache 365 of FIG. 3 and graphics controller 367 of FIG. 3 go into the Quiescent state, I/O controller hub 210 of FIG. 2 puts processor core 363 of FIG. 3 into a Deep Sleep. First, memory interface 342 of FIG. 3 sends Ack__Gev2 526 to I/O controller hub 210 of FIG. 2 through communication bus 265 of FIG. 2 when I/O controller hub 210 of FIG. 2 is ready for the transition sequence to proceed. Then, when I/O controller hub 210 of FIG. 2 receives the signal, it asserts CPUDPSLP# 550 at a point 555 to put processor core 363 of FIG. 3 into Deep Sleep state, while memory interface 342 and display engine 344 of FIG. 3 remain functional.

Once the V/F variable sections of processor 215 of FIG. 2 is in the sleep mode, after a delay, I/O controller hub 210 of FIG. 2 changes GMUXSEL# 560 at a point 565 to switch the value of variable voltage regulator 240 of FIG. 2 to change the voltage to the new value desired. Variable voltage regulator 240 of FIG. 2 is coupled to the V/F variable sections. After receiving the new voltage value, variable regulator 240 of FIG. 2 restabilizes after a delay. Then, I/O controller hub 210 of FIG. 2 deasserts CPUDPSLP# 550 at a point 556 to bring processor core 363 of FIG. 3 out of Deep Sleep state into Quick Start state. At this time, processor core 363 of FIG. 3 samples GHI# 530 when it comes out of Deep Sleep state to determine the new core frequency to come up in.

After a delay, I/O controller hub 210 of FIG. 2 sends Go__CO 528 message to memory interface 342 of FIG. 3 through communication bus 265 of FIG. 2. Memory interface 342 of FIG. 3 receives Go__CO 528 message and switches processor 215 of FIG. 2 back to normal mode at a point 517. Then, memory interface 342 of FIG. 3 brings cache 365 and graphics controller 367 of FIG. 3 back to normal mode. After a delay, I/O controller hub 210 of FIG. 2 deasserts STPCLK# 540 at a point 546, which brings processor core 363 of FIG. 3 back to normal state. Processor core 363 of FIG. 3 resumes its execution at a state 519 immediately following I/O write instruction 518. Then, the software re-enables cache 365 of FIG. 3, and then performs any additional necessary housekeeping activities. Finally, the software driver re-enables interrupts and gives control back to the operating system.

Figure 6A:
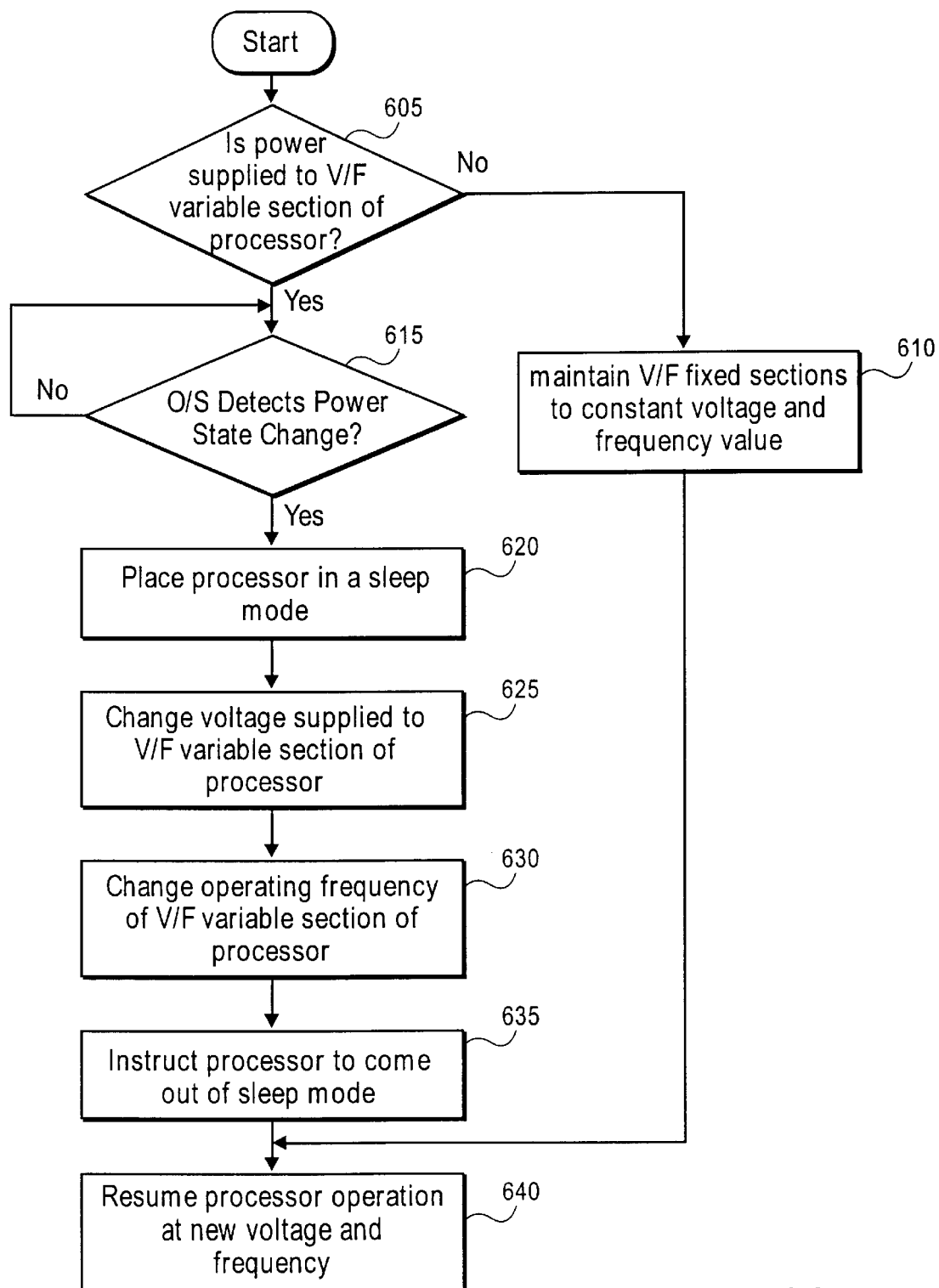
FIG. 6A is a flowchart illustrating one embodiment of a method of operating a computer.

FIG. 6A is a flowchart illustrating one embodiment of a method of operating a computer. In one embodiment, for example, the circuit and components of FIG. 2 and 3 may be used in reference to FIG. 6A. However, in another embodiment, other circuits and components may be used.

In one embodiment, for example, system board 200 of FIG. 2 may reduce the supply voltages and operating frequencies in some sections of processor (V/F variable sections), while maintaining substantially constant value to the other sections of the processor (V/F fixed sections). First, an operation system (not shown) determines whether the power is supplied to a processor is to V/F fixed sections or V/F variable sections, Step 605. For example, processor core 363, cache 365, and graphics controller 367 of FIG. 3 are voltage and frequency variable sections, which receive variable voltage and frequency from a source; and memory interface 355 and display engine 344 of FIG. 3 are voltage and frequency fixed sections, which receive substantially fixed voltage and frequency from a source.

If the power is supplied to V/F fixed sections, the operating system continually supplies substantially constant voltages and frequencies, step 610. If a power is supplied to V/F variable sections, the operating system checks for change in a power state, step 615.

In one embodiment, for example, if no change in power state is detected, system board 200 of FIG. 2 maintains the V/F fixed sections to the current power state. However, if change in the power state is detected, then the software driver instructs the sections to go into a sleep mode, step 620. For example, processor core 363, cache 365, and graphics controller 367 of FIG. 3 would go into sleep mode. Once V/F variable sections go into the sleep mode, voltage regulator 240 of FIG. 2 coupled to the V/F variable sections changes the voltage to the new value desired, step 625.

Next, the frequency of the V/F variable sections is internally changes to the new value desired, step 630. Then, the software driver instructs the V/F variable sections to come out of a sleep mode, step 635. Finally, the software driver instructs processor 215 of FIG. 2 to resume operation at the new voltage and frequency step 640.

Figure 6B:
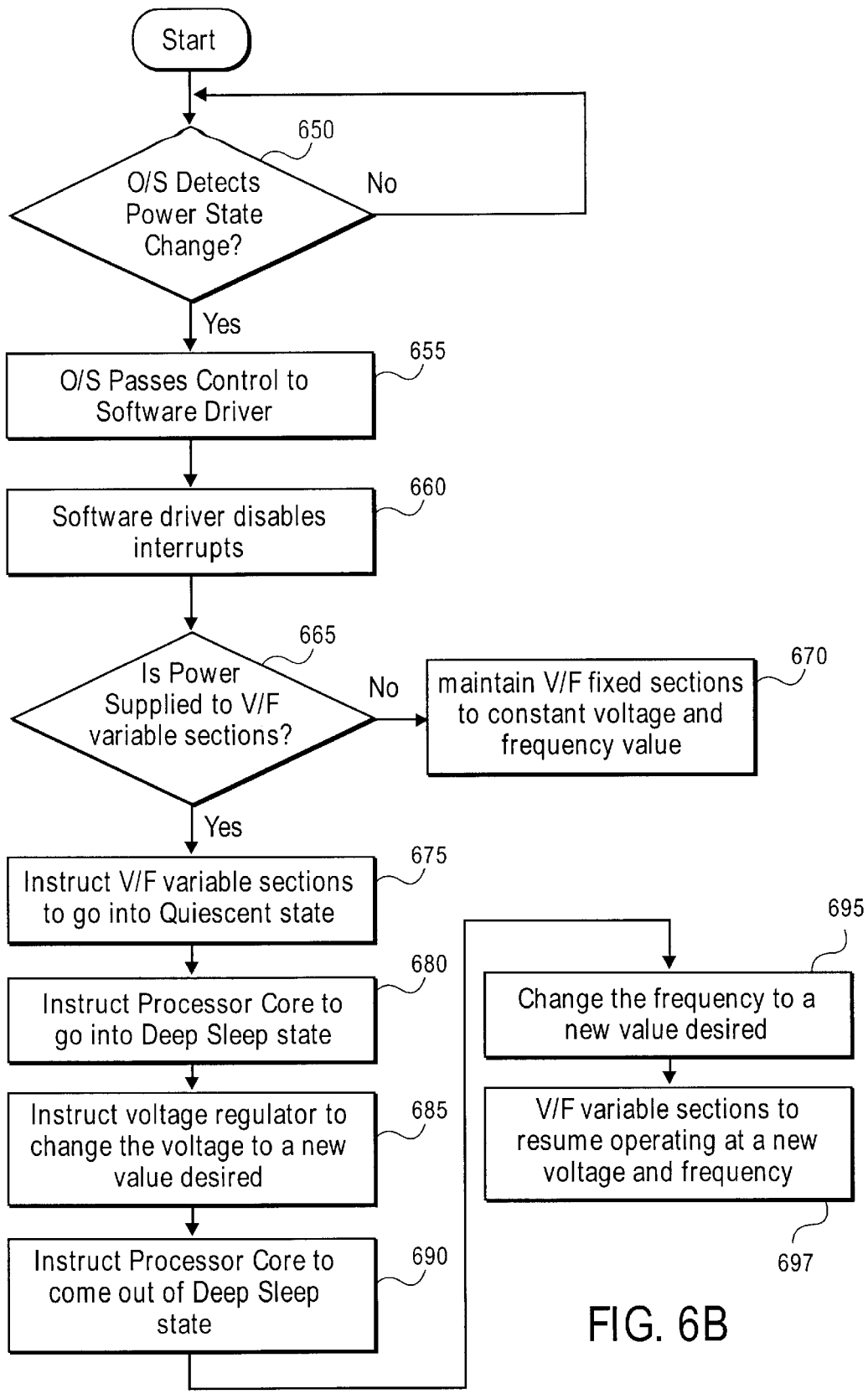
FIG. 6B is a flowchart illustrating another embodiment of a method of operating a computer.

FIG. 6B is a flowchart illustrating another embodiment of a method of operating a computer. In one embodiment, for example, the circuits and components of FIG. 2, 3, and 5 may be used in reference to FIG. 6B. However, in other embodiments, other circuits and components may be used. In one embodiment, system board 200 of FIG. 2 may reduce the supply voltages and operating frequencies in some sections of processor, while maintaining substantially constant value to the other sections of the processor.

First, operating system (not shown) makes a determination as to whether the operating environment of the computer has changed or not, step 650. If there is no change in power state, system board 200 of FIG. 2 maintains the computer in its current power state. However, if the operating environment has changed, operating system passes control to a software driver, step 655.

Then, the software driver disables interrupts, flushes cache 365 of FIG. 3, and performs any necessary housekeeping activities, step 660. Next, the software driver determines whether the power supplied is to V/F variable sections of the processor or V/F fixed sections of the processor, step 665. If the power is supplied to the V/F fixed sections of the processor, I/O controller hub 210 of FIG. 2 maintains substantially constant voltage and frequency, step 670. In one embodiment, V/F fixed sections of the processor may always receive substantially constant supply voltages and operating frequencies.

However, if the power is supplied to the V/F variable sections, the software driver instructs the sections to go into quiescent state, step 675. To bring the V/F variable sections into Quiescent state, first, the software driver writes desired value, I/O write 512 of FIG. 5, to a register (not shown) to select the desired performance state for V/F variable sections. Second, I/O controller hub 210 of FIG. 2 changes and sends GHI# 530 at a point 535 of FIG. 5 to indicate the new performance state based on the value written to processor core 363 of FIG. 3.

Third, I/O controller hub 210 of FIG. 2 asserts STPCLK# 540 of FIG. 5 to processor core 363 of FIG. 3 to stop the clock precisely after the Input/Output write instruction, I/O write 522 of FIG. 5, is retired. Fourth, processor core 363 of FIG. 3 issues Stop Grant cycle to bring processor 215 of FIG. 2 to the Quick Start (QS) state. In QS state, power consumption is reduced and the majority of V/F variable sections are disabled, but its clocking signal 369 of FIG. 3 is kept functional.

Fifth, I/O controller hub 210 of FIG. 2 runs and terminates the Stop Grant cycle on communication bus 265 of FIG. 2, then sends Go__Gev2 525 of FIG. 5 to memory interface 342 residing within processor 300 of FIG. 3 to stop generating snoops. Snoops are generated to monitor each functional unit block to check validity of data. Sixth, memory interface 342 of FIG. 3 receives the signal and switches to a mode in which it does not generate. Finally, memory interface 342 of FIG. 3 puts cache 365, and graphics controller 367 of FIG. 3 into a Quiescent state. Quiescent state is a sleep mode.

Then, memory interface 342 of FIG. 3 instructs processor core 363 of FIG. 3 to go into Deep Sleep state, step 680. First, memory interface 342 of FIG. 3 sends an acknowledge signal, Ack__Gev 526 of FIG. 5, to I/O controller hub 210 of FIG. 2 when it is ready for the transition sequence to continue. Second, when I/O controller hub 210 of FIG. 2 receives the signal, it asserts CPUDPSLP# 550 of FIG. 5 to put processor core 363 of FIG. 3 into Deep Sleep state. In the sleep mode, the V/F fixed sections of processor 300 of FIG. 3, memory interface 342 and display engine 344 of FIG. 3 remain functional.

Once processor core 363 of FIG. 3 is in Deep Sleep state, variable voltage regulator 240 of FIG. 2 changes the voltage to the new value desired, step 685. In order to change the voltage to the new value desired, I/O controller hub 210 of FIG. 2 changes the GMUXSEL# 235 FIG. 2 and sends to multiplexer 230 of FIG. 2 through communication line 233 of FIG. 2 to indicate the new voltage level. Variable voltage regulator 240 of FIG. 2 restabilizes after receiving the new voltage value. Then, memory interface 342 of FIG. 3 instructs processor core 363 of FIG. 3 to come out of Deep Sleep state, step 690.

Next, the frequency is internally changed to the new value desired, step 695, and a reset to processor core 363, cache 365, and graphics controller 367 of FIG. 3 is not necessary. This means that computer 100 of FIG. 1 does not have to go through an initialization sequence all over again.

In order to change the frequency to the new value, first, I/O controller hub 210 of FIG. 2 deasserts the CPUDPSLP# 550 at point 556 of FIG. 5, which brings processor core 363 of FIG. 3 out of Deep Sleep state into the Quick Start state. At this time, processor core 363 of FIG. 3 samples the GHI# 530 of FIG. 5 when it comes out of Deep Sleep to determine the new frequency to come up in V/F variable sections. Second, after clocking circuit 369 of FIG. 3 ramps up at the new frequency, I/O controller hub 210 of FIG. 2 sends a signal to memory interface 342 of FIG. 3 to start normal operation.

Once the frequency is changed to new desired value, procedure to resume operation of V/F variable sections at a new voltage and frequency is performed, step 697. First, memory interface 342 of FIG. 3 receives Go__Co 528 of FIG. 5 and switches to the normal mode. Second, memory interface 342 of FIG. 3 brings graphics controller 367 and cache 365 of FIG. 3 back to normal mode. Third, I/O controller hub 210 of FIG. 2 deasserts STPCLK# 540 at point 546, which brings the processor core 363 of FIG. 3 back to normal state. Processor core 363 of FIG. 3 resumes its execution immediately following the I/O Write instruction 518 of FIG. 5. Fourth, the software re-enables cache 365 of FIG. 3, and then performs any additional necessary housekeeping activities. Finally, the software driver re-enables interrupts and gives control back to the operating system.

In the foregoing specification, the invention has been described with reference to specific exemplary embodiments thereof. It will, however, be evident that various modifications and changes may be made thereto without departing from the broader spirit and scope of the invention as set forth in the following claims. The specification and drawings are, accordingly, to be regarded in an illustrative sense rather than a restrictive sense.

What is claimed is:

1. An apparatus, comprising:
a processor comprising a first section and a second section;
a variable voltage regulator coupled to the first section of the processor to supply a first voltage;
a fixed voltage regulator coupled to the second section of the processor to supply a substantially fixed voltage; and
a multiplexer coupled to the variable voltage regulator to select the first voltage, wherein the multiplexer is further coupled to a controller, the controller to output one of a plurality of voltage codes to the multiplexer to control the selection of the first voltage.

2. The apparatus of claim 1, wherein the apparatus further comprises a clocking circuit to generate a plurality of independently operative frequencies.

3. A method, comprising:
generating a first supply voltage by a first voltage regulator;
generating a second supply voltage by a second voltage regulator;
supplying the first supply voltage generated by the first voltage regulator to a first section of a processor; and
supplying the second voltage generated by the second voltage regulator to a second section of the processor, the first and second sections of the processor to operate with a same power source, wherein generating the first supply voltage comprises selecting one of a plurality of voltage codes.

4. The method of claim 3, wherein the first supply voltage is different than the second supply voltage.

5. The method of claim 3, wherein selecting one of the plurality of voltage codes comprises transmitting a signal to a multiplexer.

6. The method of claim 3, wherein the second supply voltage has a substantially fixed value.

7. The method of 3, further comprising:
generating plurality of clock signals having a plurality of frequencies by a clocking circuit contained within the processor;
supplying a first generated clock signal having a first operating frequency to a first section of the processor; and
supplying a second generated clock signal having a second operating frequency to a second section of the processor, the first and the second sections of the processor to operate with a same power source.

8. The method of claim 7, further comprising: generating the first operating frequency different than the second operating frequency.

9. A method, comprising:
changing a power supply voltage supplied to a processor;
adjusting a first frequency of a first clock signal using a first set of frequency dividers to a first section of the processor, the adjusting based on the change in the power supply voltage, the first section of the processor to contain at least one subsection; and
maintaining a second frequency of a second clock signal using a second set of frequency dividers to a second section of the processor.

10. The method of claim 9, further comprising:

adjusting a third frequency of a third clock signal using a third set of frequency dividers to a third section of the processor, the adjusting based on the change in the power supply voltage.

11. The method of claim 9, further comprising:

generating a first supply voltage to a first set of voltage regulators to the first and the third sections of the processor, the generating based on the change in the power; and maintaining a second supply voltage to a substantially fixed supply voltage to the second section of the processor using a second voltage regulator, the maintaining independent of the change in the power.

12. A processor, comprising:

a first set of frequency dividers to adjust a first frequency of a first clock signal based on a change in a power source coupled to the processor; and a first section of the processor to receive the adjusted first frequency of the first clock signal and a variable voltage supply based on the change in the power source;

a second set of frequency dividers to maintain a second frequency of a second clock signal to a substantially fixed operating frequency; and a second section of the processor to receive the fixed second frequency of the clock signal and a fixed voltage independent of the change in the power source.

13. The processor of claim 12, wherein the first section is a processor core.

14. The processor of claim 12, wherein the second section is a memory interface.

15. The processor of claim 12, wherein the first section is a cache.

16. The processor of claim 12, wherein the first section is a graphics controller.

17. A method, comprising:

operating a plurality of sections of a processor with a frequency and a voltage when the processor is supplied with power from an alternating current source;

reducing both the frequency and the voltage to one of the plurality of sections of the processor when the processor is supplied with power from a direct current source; and maintaining at least one of the frequency and the voltage to another of the plurality of sections of the processor when the processor is supplied with power from the direct current source.

18. A method of claim 17, wherein reducing comprises:

detecting a change to the direct current source;

placing the one of the plurality of sections in a sleep mode; and reducing both the voltage and the frequency supplied to the one of the plurality of sections of the processor.

19. The method of claim 18, wherein reducing further comprises:

instructing the one of the plurality of sections to come out of sleep mode; and resuming operation of the one of the plurality of sections of the processor with the at least one of reduced voltage and frequency.

20. An apparatus, comprising:

means for operating a plurality of sections of a processor with a frequency and a voltage when the processor is supplied with power from an alternating current source;

means for reducing at least one of the frequency and the voltage to one of the plurality of sections of the processor when the processor is supplied with power from a direct current source; and means for maintaining at least one of the frequency and the voltage to another of the plurality of sections of the processor when the processor is supplied with power from the direct current source.

21. The apparatus of claim 20, wherein the means for reducing comprises:

means for detecting a change to the direct current source;

means for placing the one of the plurality of sections in a sleep mode;

means for reducing at least one of the voltage and the frequency supplied to the one of the plurality of sections of the processor;

means for instructing the one of the plurality of sections to come out of sleep mode; and means for resuming operation of the one of the plurality of sections of the processor with the at least one of reduced voltage and frequency.

* * * * *

UNITED STATES PATENT AND TRADEMARK OFFICE
CERTIFICATE OF CORRECTION

PATENT NO. : 6,785,829 B1
DATED : August 31, 2004
INVENTOR(S) : George et al.

It is certified that error appears in the above-identified patent and that said Letters Patent is hereby corrected as shown below:

Column 4,
Line 45, before "component", delete ",".

Column 9,
Line 34, delete "Go_CO" and insert -- Go_C0 --.
Line 36, delete "Go_CO" and insert -- Go_C0 --.

Signed and Sealed this

Twenty-second Day of February, 2005

JON W. DUDAS
*Director of the United States Patent and Trademark Office*